US 11,211,833 B2

(12) United States Patent
Park et al.

(10) Patent No.: US 11,211,833 B2
(45) Date of Patent: Dec. 28, 2021

(54) WIRELESS POWER TRANSFER APPARATUS

(71) Applicant: LG Electronics Inc., Seoul (KR)

(72) Inventors: Joonho Park, Seoul (KR); Seonghun Lee, Seoul (KR); Bongsik Kwak, Seoul (KR); Jihyun Lee, Seoul (KR); Sungkyu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 12 days.

(21) Appl. No.: 16/741,908

(22) Filed: Jan. 14, 2020

(65) Prior Publication Data

US 2020/0227951 A1 Jul. 16, 2020

(30) Foreign Application Priority Data

Jan. 14, 2019 (KR) ........................ 10-2019-0004590

(51) Int. Cl.
| | | |
|---|---|---|
| *H02J 50/60* | (2016.01) | |
| *H02J 50/12* | (2016.01) | |
| *H02J 50/40* | (2016.01) | |
| *H01F 38/14* | (2006.01) | |
| *H02J 7/00* | (2006.01) | |

(52) U.S. Cl.
CPC .............. *H02J 50/60* (2016.02); *H01F 38/14* (2013.01); *H02J 7/0029* (2013.01); *H02J 50/12* (2016.02); *H02J 50/40* (2016.02)

(58) Field of Classification Search
None
See application file for complete search history.

(56) References Cited

U.S. PATENT DOCUMENTS

| | | | | |
|---|---|---|---|---|
| 10,330,743 | B2* | 6/2019 | Komiyama | .......... G01R 33/028 |
| 2012/0306284 | A1* | 12/2012 | Lee | ..................... H04B 5/0037 |
| | | | | 307/104 |
| 2013/0241300 | A1 | 9/2013 | Miyamoto | |
| 2014/0084857 | A1 | 3/2014 | Liu et al. | |
| 2016/0241087 | A1* | 8/2016 | Bae | ..................... H02J 7/00034 |
| 2016/0336760 | A1 | 11/2016 | Yamamoto et al. | |

(Continued)

FOREIGN PATENT DOCUMENTS

| | | |
|---|---|---|
| JP | 2015053751 | 3/2015 |
| JP | 2018046746 | 3/2018 |

OTHER PUBLICATIONS

Extended European Search Report in European Application No. 20151476.7, dated May 12, 2020, 3 pages.

(Continued)

*Primary Examiner* — Lincoln D Donovan
*Assistant Examiner* — Khareem E Almo
(74) *Attorney, Agent, or Firm* — Fish & Richardson P.C.

(57) ABSTRACT

The present invention relates to a wireless power transfer apparatus. The wireless power transfer apparatus includes: a resonant circuit unit including a plurality of coils and a plurality of capacitor elements respectively connected to the plurality of coils; and a controller configured to calculate individual quality factor of each of the plurality of coils and a total quality factor of the plurality of coils, at a resonant frequency, and calculate whether foreign matter exists on a charging surface, based on the total quality factor and the individual quality factor, at the resonance frequency. Accordingly, foreign matter on the charging surface can be detected more easily.

19 Claims, 10 Drawing Sheets

(56) References Cited

U.S. PATENT DOCUMENTS

| | | | |
|---|---|---|---|
| 2017/0103849 A1* | 4/2017 | Leem | H01F 41/10 |
| 2017/0288412 A1* | 10/2017 | Yamamoto | H02J 50/70 |
| 2018/0316388 A1* | 11/2018 | Lee | H04B 5/0031 |
| 2018/0323658 A1 | 11/2018 | Cheikh | |
| 2018/0337549 A1 | 11/2018 | Chen et al. | |
| 2019/0131826 A1* | 5/2019 | Park | H02J 7/00034 |
| 2019/0222060 A1* | 7/2019 | Leem | H04B 5/0081 |
| 2020/0382167 A1* | 12/2020 | Park | H02J 50/80 |
| 2021/0036555 A1* | 2/2021 | Park | H04L 29/06 |
| 2021/0050749 A1* | 2/2021 | Muratov | H02J 7/00045 |

OTHER PUBLICATIONS

Japanese Office Action in Japanese Appln. No. 2020-002643, dated Feb. 2, 2021, 9 pages (with English translation).

\* cited by examiner

WIRELESS POWER TRANSFER APPARATUS

CROSS-REFERENCE TO RELATED APPLICATION

This application claims the benefit of priority to Korean Application No. 10-2019-0004590, filed on Jan. 14, 2019, the disclosure of which is incorporated by reference in its entirety.

BACKGROUND OF THE INVENTION

1. Field of the Invention

The present invention relates to a wireless power transfer apparatus, and more particularly, to a wireless power transfer apparatus that can more easily detect foreign matter on a charging surface.

2. Description of the Related Art

As a method for supplying power to an electronic device, there is a terminal supply method for connecting a physical cable or wire to a commercial power supply and the electronic device. In this terminal supply method, cables or wires occupy considerable space, are not easy to arrange, and there is a risk of disconnection.

Recently, in order to solve this problem, research on a wireless power transfer method has been discussed.

A wireless power transfer system may include a wireless power transfer apparatus that supplies power through a single coil or multiple coils, and a wireless power reception apparatus that receives and uses the power supplied wirelessly from the wireless power transfer apparatus.

An inductive coupling method is mainly used as a wireless power supply method. In this method, when the intensity of a current flowing through a first coil of two adjacent coils is changed, the magnetic field is changed due to the current, so that the magnetic flux passing through a second coil is changed, thereby generating an induced electromotive force in the second coil side. That is, according to this method, if the current of the first coil is changed while two coils are spaced apart without moving two conductors spatially, induced electromotive force is generated.

However, such an inductive coupling method may also have a problem such as overload, product damage, explosion because of due to deterioration due to the foreign matter, when foreign matter is inserted between the wireless power transfer apparatus and the wireless power reception apparatus during charging, due to the feature of contactless charging. Therefore, a method of more easily detecting a foreign material on the charging surface of the wireless power transfer apparatus is required.

Meanwhile, the 'wireless power system' disclosed in U.S. Pat. No. 9,825,486B2 proposes a method of detecting foreign matter through voltage oscillation of a resonant tank containing a detection coil and a capacitor.

However, since the above-mentioned 'wireless power system' requires a detection coil for detecting foreign matter in addition to a power transfer coil, the product cost increases and the circuit becomes complicated.

Meanwhile, the 'inductive charging device' disclosed in US 2017/0302111 proposes a method of detecting an object on the charging surface by using a resonance frequency, and detecting a foreign material by using a quality factor.

However, since the above 'inductive charging device' further includes a step of recognizing an object through the resonant frequency, there is a problem that the total charging time increases, and the foreign matter detection performance is reduced as a charging area is widened, since foreign matter is detected by using a resonant frequency of single coil and a quality factor Q.

SUMMARY OF THE INVENTION

The present invention has been made in view of the above problems, and provides a wireless power transfer apparatus capable of more accurately detecting a foreign matter on a charging surface, in a partially overlapping multi-coil.

The present invention further provides a wireless power transfer apparatus capable of more easily detecting a foreign matter in a wide range of the charging surface, in a partially overlapping multi-coil.

The present invention further provides a wireless power transfer apparatus capable of more accurately detecting a foreign matter on a charging surface, without a separate foreign matter detection circuit.

In accordance with an aspect of the present invention, a wireless power transfer apparatus includes: a resonant circuit unit including a plurality of coils and a plurality of capacitor elements respectively connected to the plurality of coils; and a controller configured to calculate individual quality factor of each of the plurality of coils and a total quality factor of the plurality of coils, at a resonant frequency, and calculate whether foreign matter exists on a charging surface, based on the total quality factor and the individual quality factor, at the resonance frequency.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention. Reference will now be made in detail to the preferred embodiments of the present invention, examples of which are illustrated in the accompanying drawings. The suffixes "module" and "unit" in elements used in description below are given only in consideration of ease in preparation of the specification and do not have specific meanings or functions. Therefore, the suffixes "module" and "unit" may be used interchangeably. In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

Figure 1:
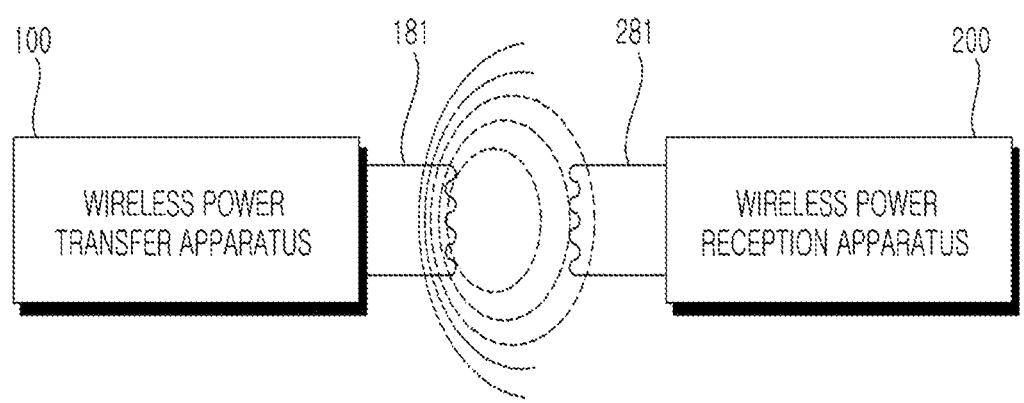
FIG. 1 is an example of an internal block diagram of a wireless power system according to an embodiment of the present invention.

FIG. 1 is an example of an internal block diagram of a wireless power system according to an embodiment of the present invention.

Referring to the drawings, the wireless power system 10 may include a wireless power transfer apparatus 100 for wirelessly transmitting power and a wireless power reception apparatus 200 for wirelessly receiving the transmitted power.

The wireless power transfer apparatus 100 may transfer power to the wireless power reception apparatus 200, by using a magnetic induction phenomenon that induces a current in a reception coil 281 by changing a magnetic field of a coil 181. In this case, the wireless power transfer apparatus 100 and the wireless power reception apparatus 200 may use a wireless charging method of an electromagnetic induction type defined by the Wireless Power Consortium (WPC) or the Power Matters Alliance (PMA). Alternatively, the wireless power transfer apparatus 100 and the wireless power reception apparatus 200 may use a wireless charging method of a magnetic resonance type defined in A4WP (Alliance for Wireless Power).

The wireless power transfer apparatus 100 may wirelessly transmit power to charge the wireless power reception apparatus 200.

According to an embodiment, a single wireless power transfer apparatus 100 may charge a plurality of wireless power reception apparatuses 200. In this case, the wireless power transfer apparatus 100 may distribute and transmit power to the plurality of wireless power reception apparatuses 200 in a time division manner, but is not limited thereto. As another example, the wireless power transfer apparatus 100 may distribute and transmit power to the plurality of wireless power reception apparatuses 200 by using different frequency bands allocated for each wireless power reception apparatus 200. The number of wireless power reception apparatuses 200 that can be connected to a single wireless power transfer apparatus 100 may be adaptively determined in consideration of the required power amount for each wireless power reception apparatus 200, the amount of available power of the wireless power transfer apparatus 100, and the like.

In another embodiment, the plurality of wireless power transfer apparatuses 100 are able to charge the at least one wireless power reception apparatus 200. In this case, the at least one wireless power reception apparatus 200 may be simultaneously connected to the plurality of wireless power transfer apparatuses 100, and may simultaneously receive power from the connected wireless power transfer apparatus 100 to perform charging. In this case, the number of the wireless power transfer apparatus 100 may be adaptively determined in consideration of the required power amount for each wireless power reception apparatus 200, the amount of available power of the wireless power transfer apparatus 100, and the like.

The wireless power reception apparatus 200 may receive power transmitted from the wireless power transfer apparatus 100.

For example, the wireless power reception apparatus 200 may be a mobile phone, a laptop computer, a wearable device such as a smart watch, a personal digital assistant (PDAs), a portable multimedia player (PMP), a navigation device, a MP3 player, an electric toothbrush, a lighting device, and a remote control, but the present invention is not limited thereto, and an electronic device that can be used through battery charging is sufficient to be utilized.

The wireless power transfer apparatus 100 and the wireless power reception apparatus 200 may bidirectionally communicate. According to an embodiment, the wireless power transfer apparatus 100 and the wireless power reception apparatus 200 may perform unidirectional communication or half duplex communication.

In this case, the communication method may be an in-band communication method using the same frequency band and/or an out-of-band communication method using a different frequency band.

For example, the information exchanged between the wireless power transfer apparatus 100 and the wireless power reception apparatus 200 may include mutual state information, power usage information, battery charge information, battery output voltage/current information, control information, and the like.

Figure 2:
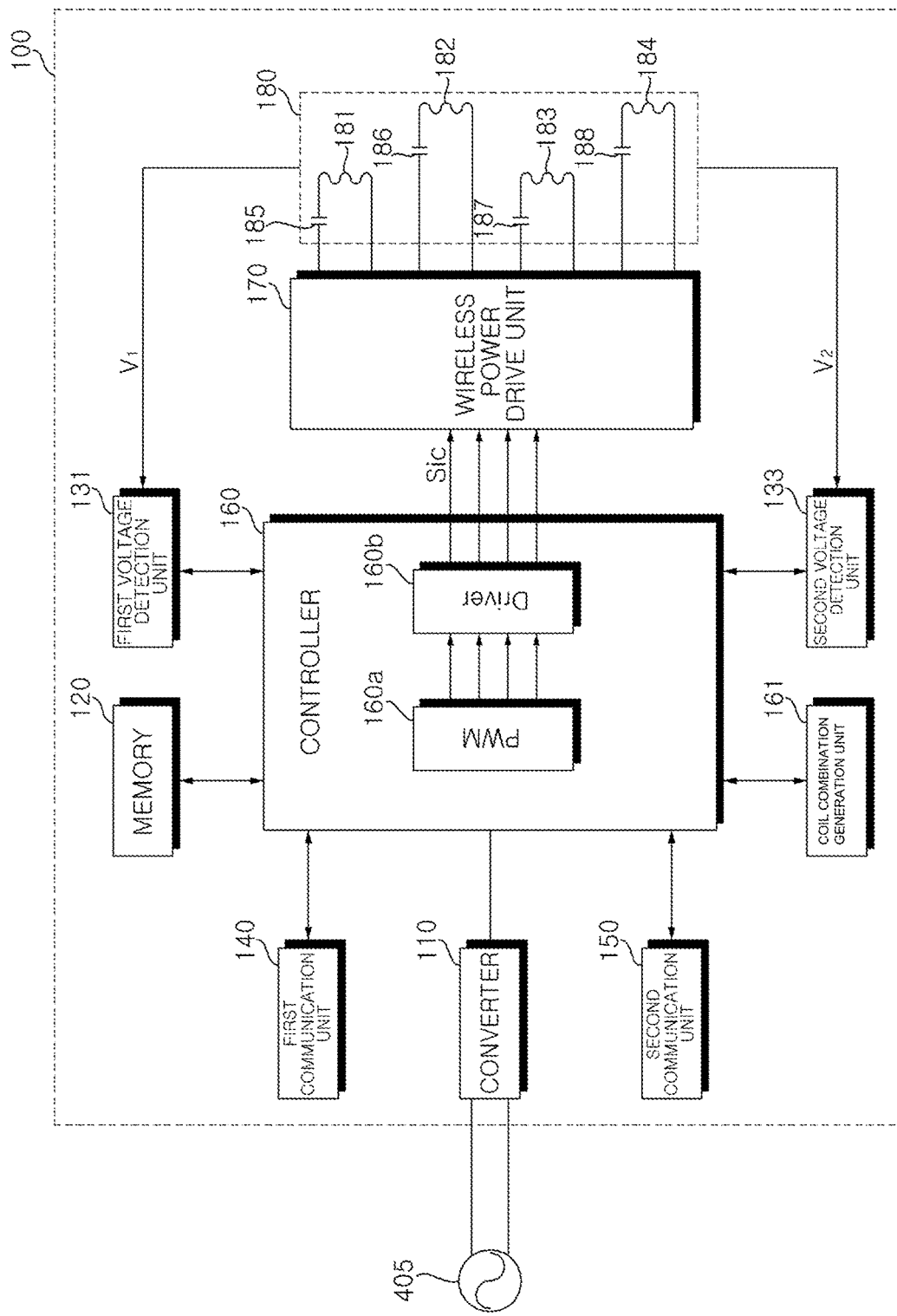
FIG. 2 is an internal block diagram of a wireless power transfer apparatus in the wireless power system of FIG. 1.

FIG. 2 is an internal block diagram of a wireless power transfer apparatus in the wireless power system of FIG. 1.

Referring to the drawings, the wireless power transfer apparatus 100 may include a converter 110 for converting commercial AC power 405 into a DC power, a wireless power drive unit 170 for converting DC power into AC power, and a resonant circuit unit 180 for wirelessly transmitting power by using the converted AC power.

In addition, the wireless power transfer apparatus 100 may include a controller 160 for controlling an internal configuration of the wireless power transfer apparatus 100 for power transfer and communication, a coil combination generation unit 161 for generating a coil combination so as to include at least one coil of a plurality of coils 181 to 184, a first communication unit 140 and a second communication unit that communicate with the wireless power reception apparatus 200 by a certain communication method, a first voltage detection unit 131 for detecting an input voltage inputted to each of the plurality of coils 181 to 184, a second voltage detection unit 133 for detecting voltage between both ends of each of the plurality of coils, and a memory 120 for storing a control program for driving the wireless power transfer apparatus 100.

The wireless power transfer apparatus 100 is operated by a DC power, and this DC power may be supplied by the converter 110 for converting commercial AC power into DC power.

The converter 110 may convert and output the commercial AC power 405 into a DC power. In the drawing, the commercial AC power 405 is shown as a single phase AC power, but it may be a three phase AC power. The internal structure of the converter 110 may also be changed according to the type of the commercial AC power 405.

Meanwhile, the converter 110 may be implemented by a diode or the like without a switching element, and may perform rectification operation without a separate switching operation.

For example, in the case of single phase AC power, four diodes may be used in the form of a bridge, and in the case of three phase AC power, six diodes may be used in the form of a bridge.

Meanwhile, the converter 110 may be, for example, a half bridge type converter in which two switching elements and four diodes are connected. In the case of a three-phase AC power, six switching elements and six diodes may be used.

In the wireless power transfer, when the DC power is supplied from the converter 110 to the wireless power drive unit 170, the controller 160 may control the power drive unit 170 to wirelessly transmit the wireless power reception apparatus 200. In this case, the wireless power drive unit 170 may convert the DC power into AC power for wireless power transfer.

In detail, the controller 160 may include a PWM generation unit 160*a* for generating a PWM signal, and a driver 160*b* for generating and outputting a driving signal Sic based on the PWM signal.

The controller 160 may determine the duty of the PWM signal, based on the power transfer amount, the current value flowing through the wireless power drive unit 170, and the like. The PWM generation unit 160*a* may generate a PWM signal, based on the duty of the PWM signal. The driver 160*b* may output a driving signal Sic for driving the wireless power drive unit 170, based on the PWM signal.

The wireless power drive unit 170 may include at least one switching element (not shown) for converting DC power into AC power. For example, when the switching element is IBGT, a gate driving signal may be outputted from the driver 160*b* and inputted to a gate terminal of the switching element. In addition, the switching element may perform a switching operation according to the gate driving signal. The DC power may be converted into AC power by the switching operation of the switching element, and the converted AC power may be outputted to the resonance circuit unit 180.

Meanwhile, in some embodiments, the wireless power drive unit 170 may be configured to be contained in the controller 160.

The resonant circuit unit 180 may include a plurality of coils 181 to 184 (hereinafter, referred to as 181 when there is no need for division). The plurality of coils 181 may be partially overlapped.

The resonant circuit unit 180 may wirelessly transmit power to the wireless power reception apparatus 200 through any one coil combination selected from the plurality of coils 181.

Since the power is transmitted by the coil combination included in the resonant circuit unit 180, the resonant circuit unit 180 may be referred to as a transmission coil unit or a coil unit.

Figure 3:
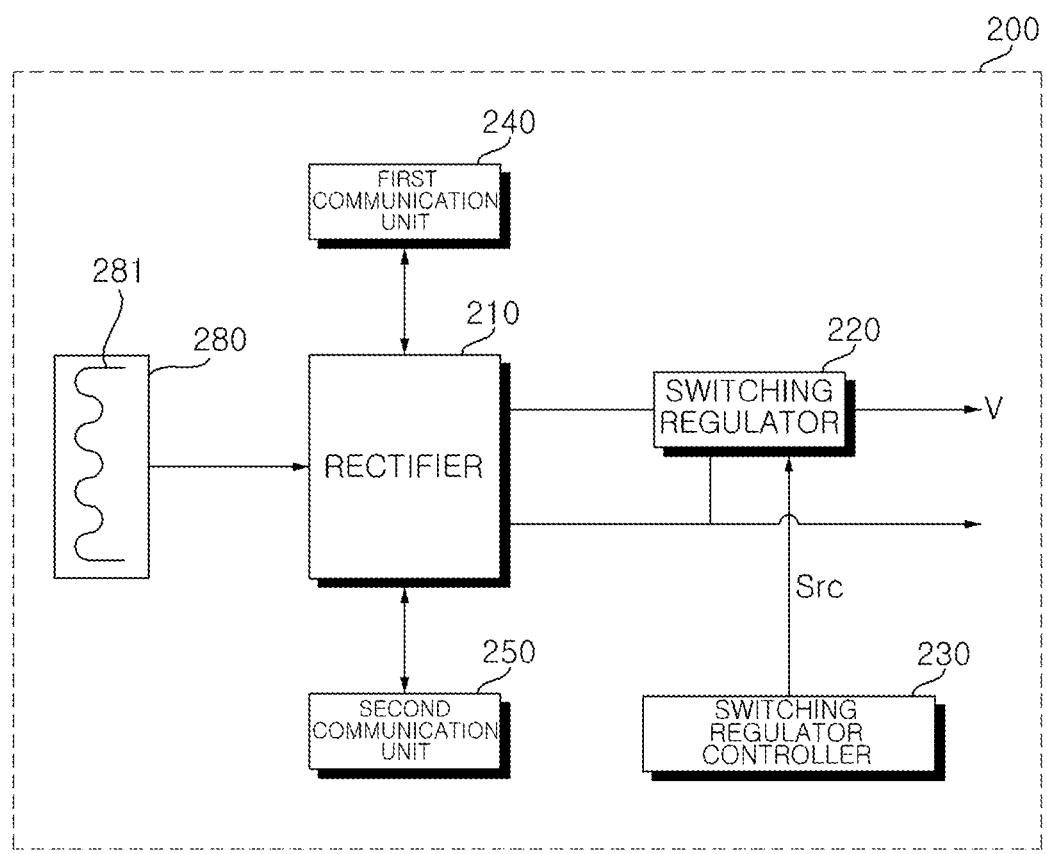
FIG. 3 is an internal block diagram of a wireless power reception apparatus in the wireless power system of FIG. 1.

In addition, the plurality of coils 181 may be referred to as a plurality of transmission coils 181 to distinguish them from the reception coil 281 of FIG. 3.

Meanwhile, since the leakage inductance is high and the coupling factor is low as the plurality of coils 181 are spaced apart from the reception coil 281, the transmission efficiency may be low.

Therefore, in order to improve transmission efficiency, the wireless power transfer apparatus 100 of the present invention may connect a capacitor to each of the plurality of coils 181 to 184 to form a resonant circuit with the reception coil 281.

The resonant circuit unit 180 may include a plurality of coils 181 to 184 and a plurality of capacitor elements 185 to 188 respectively connected to the plurality of coils 181 to 184.

The plurality of capacitor elements 185 to 188 may be connected in series to each of the plurality of coils 181 to 184 to form a resonance circuit.

In some embodiments, unlike FIG. 2, the plurality of capacitor elements 185 to 188 may be connected to each of the plurality of coils 181 to 184 in parallel to form a resonance circuit.

The plurality of coils 181 to 184 and the plurality of capacitor elements 185 to 188 may determine the resonance frequency of the power transfer.

The resonant circuit unit 180 may further include a shielding member (190 of FIG. 4) disposed in one side of the plurality of coils 181 to shield the leaking magnetic field.

The coil combination generation unit 161 may generate a coil combination so as to include at least one coil of the plurality of coils 181 to 184.

The first communication unit 140 may communicate with the wireless power reception apparatus 200 in a first communication method. The first communication unit 140 may perform a certain signal processing for state information, power control information, and the like of the wireless power transfer apparatus 200 to transmit to the wireless power reception apparatus 200, and may receive state information, power usage amount information, charging efficiency information, and the like of the wireless power reception apparatus 200 to perform a certain signal processing, and then transmit to the controller 160.

The second communication unit 150 may communicate with the wireless power reception apparatus 200 in a second communication method different from the first communication method. The second communication unit 140 may also perform a certain signal processing for state information, power control information, and the like of the wireless power transfer apparatus 200 to transmit to the wireless power reception apparatus 200, and may receive state information, power usage amount information, charging efficiency information, and the like of the wireless power reception apparatus 200 to perform a certain signal processing, and then transmit to the controller 160.

The first communication unit 140 and the second communication unit 150 may further include a modulation and demodulation unit (not shown) for modulating/demodulating a data signal transmitted from the wireless power transfer apparatus 100 and a data signal received by the wireless power reception apparatus 200.

In addition, the first communication unit 140 and the second communication unit 150 may further include a filter unit (not shown) for filtering a data signal from the wireless power reception apparatus 200. In this case, the filter unit (not shown) may include a band pass filter (BPF).

Meanwhile, the first communication method may be an in-band communication method using the same frequency band as the wireless power reception apparatus 200, and the second communication method may be an out-of-band communication method using a frequency band different from that of the wireless power reception apparatus 200.

The wireless power transfer apparatus 100 may change a communication method based on power information of the wireless power reception apparatus 200.

Meanwhile, when an object is placed on the charging surface, voltage between both ends of the plurality of coils 181 to 184 or the plurality of capacitor elements 185 to 188 may be changed.

For example, when the metal material is placed on the charging surface, voltage between both ends of the plurality of coils 181 to 184 may be reduced.

Figure 10:
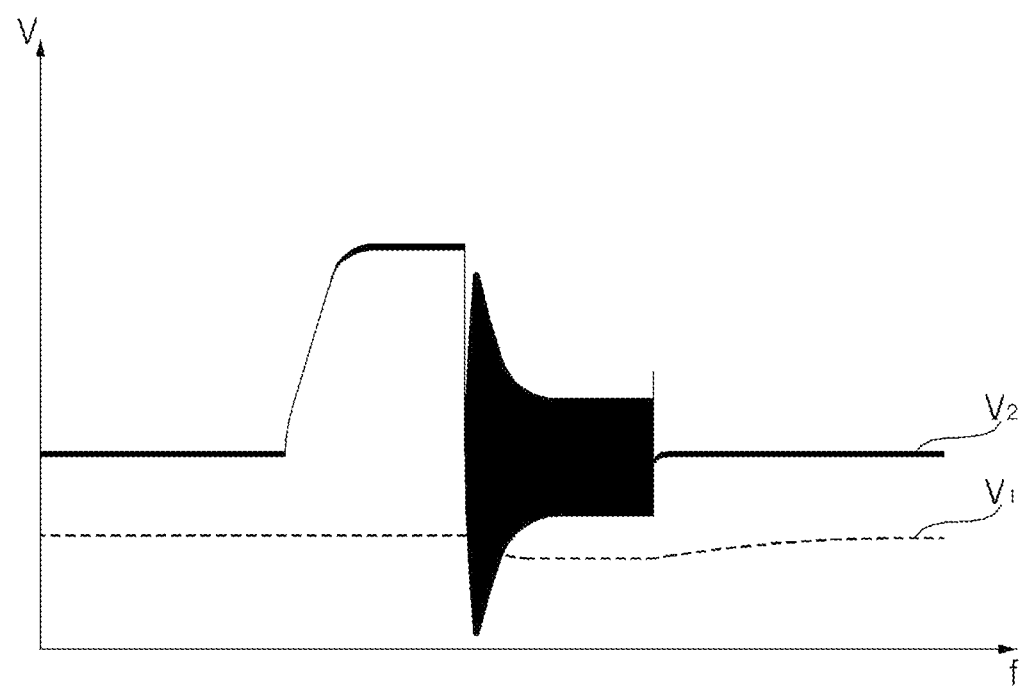
FIG. 10 is a reference diagram for explaining the individual quality factor of FIG. 8.

In addition, by an experiment as shown in FIG. 10, when an object is placed on the charging surface, it can be seen that the input voltage inputted to the resonant circuit unit 180 is also changed.

The first voltage detection unit 131 may detect an input voltage V1 inputted to each of the plurality of coils 181 to 184 and/or each of the capacitor elements 185 to 188.

The second voltage detection unit 133 may detect a voltage between both ends of each of the plurality of coils 181 to 184 and/or the capacitor elements 185 to 188.

Meanwhile, hereinafter, for convenience of description, it is described that the first voltage detection unit 131 detects an input voltage V1 inputted to each of the plurality of coils 181 to 184, and the second voltage detection unit 133 detects a voltage V2 between both ends of each of the plurality of coils 181 to 184. However, as described above, even in the case where the first voltage detection unit 131 detects an input voltage V1 inputted to each of the plurality of capacitor elements 185 to 188, and the second voltage detection unit 133 detects a voltage V2 between both ends of each of the plurality of capacitor elements 185 to 188, the value of the quality factor Q, which will be described later, is the same.

The first voltage detection unit 131 may transmit the input voltage V1 inputted to each of the plurality of coils 181 to 184 to the controller 160, as a detection value.

The second voltage detection unit 133 may transmit the voltage V2 between both ends of each of the plurality of coils 181 to 184 to the controller 160, as a detection value.

The controller 160 may calculate an individual quality factor Qi of the plurality of coils 181 to 184, based on the input voltage V1 inputted to each of the plurality of coils 181 to 184, and the voltage V2 between both ends of each of the plurality of coils 181 to 184.

More specifically, the individual quality factor Qi may be calculated by the following equation 1. In this case, Qi may be an individual quality factor, V1 may be an input voltage, and V2 may be a voltage of both ends.

$$Q_i = \frac{V2}{V1} \quad \text{[Equation 1]}$$

In particular, the controller 160 may calculate the individual quality factor Qi of each of the plurality of coils 181 to 184 at the resonance frequency.

In detail, the controller 160 may sweep from a low frequency to a high frequency, within an operation frequency (or available frequency) band.

Usually, the input voltage V1 inputted to each of the plurality of coils 181 to 184 is not changed despite the frequency sweep. However, in practice, as shown in FIG. 10, at the time when the foreign matter is placed on the charging surface, it may be slightly reduced.

The voltage V2 of both ends of the plurality of coils 181 to 184 may be gradually increased and then decreased, as the frequency increases.

The first voltage detection unit 131 may transmit the input voltage V1 inputted to each of the plurality of coils 181 to 184 to the controller 160, in response to the frequency sweep.

The second voltage detection unit 133 may transmit the voltage V2 between both ends of each of the plurality of coils 181 to 184 to the controller 160, in response to the frequency sweep.

The controller 160 may calculate the maximum value of the ratio of the voltage V2 with respect to the input voltage V1 which changes according to the frequency sweep, as the individual quality factor Qi of a corresponding coil.

The controller 160 may calculate the sum of each individual quality factor Qi at the resonance frequency as the total quality factor Qt, at the resonance frequency.

For example, when the resonant circuit unit 180 includes first to fourth coils, and the individual quality factor Qi is Qi1, Qi2, Qi3, and Qi4, the total quality factor Qt may be calculated by the following equation 2.

$$Q_t = Q_{i1} + Q_{i2} + Q_{i3} + Q_{i4} \quad \text{[Equation 2]}$$

The controller 160 may calculate the presence or absence of the foreign matter on the charging surface, based on the total quality factor Qt and the individual quality factor Qi at the resonance frequency.

Meanwhile, when the foreign matter exists on the charging surface, since the voltage V2 between both ends of the plurality of coils 181 to 184 is reduced, the quality factor is usually reduced, but the quality factor may be increased due to design error, measurement error, foreign matter movement, and the like.

Therefore, the present invention can determine the foreign matter, based on the normal range, not on the normal threshold value of the quality factor.

The controller 160 may calculate whether the total quality factor Qt at the resonance frequency is included in a preset first reference range.

In this case, the first reference range may be a value acquired by adding the first measurement error to the normal threshold value of the total quality factor Qt. Meanwhile, the normal threshold value may mean the total quality factor Qt of the plurality of coils 181 to 184, when foreign matter does not exist on the charging surface. In addition, a first measurement error may be, for example, ±1.2%.

If the total quality factor Qt at the resonant frequency is not included in a preset first reference range, the controller 160 may calculate that the foreign matter exists on the charging surface.

Meanwhile, when a foreign matter on the charging surface is detected by only the total quality factor Qt at the resonance frequency, an error may occur. That is, the total quality factor Qt at the resonance frequency may be included in the normal range, but at least one of the individual quality factors may beyond the normal range.

Therefore, even if the total quality factor Qt at the resonant frequency is included in the first reference range, the controller 160 does not immediately calculate that there is no foreign matter on the charging surface, but may recalculate the presence of foreign matter on the charging surface based on the individual quality factor Qi at the resonant frequency.

When all individual quality factors Qi at the resonance frequency is included in a preset second reference range in the state where the total quality factor Qt at the resonance frequency is included in the first reference range, the controller 160 may calculate that there is no foreign matter on the charging surface.

In this case, the second reference range may be a value acquired by adding a second measurement error to a normal threshold value of the total quality factor Qt. Meanwhile, the normal threshold value may mean an individual quality factor Qi of each of the plurality of coils 181 to 184, when there is no foreign matter on the charging surface. In addition, the second measurement error may be, for example, ±1.2%.

Meanwhile, the normal threshold value of each individual quality factor Qi may be set differently for each coil, or set to be the same for all.

For example, when the resonant frequencies of each of the plurality of coils 181 to 184 are set differently, the normal threshold value of the individual quality factor Qi may be different for each coil. In this case, the second measurement error may be set differently for each coil.

As another example, when all the resonant frequencies of each of the plurality of coils 181 to 184 are set to be the same, all the normal threshold values of the individual quality factor Qi may be the same.

The memory 120 may store a program for the operation of the power transfer apparatus 100.

In addition, the memory 120 may store the transmission intensity of each object detection signal transmitted from the plurality of coils so as to detect an object on the charging surface.

In addition, the memory 120 may store the transmission intensity of each coil selection signal transmitted from the plurality of coils.

In this case, the transmission intensity of the object detection signal and the transmission intensity of the coil selection signal may be a factory calibrated signal.

Figure 4:
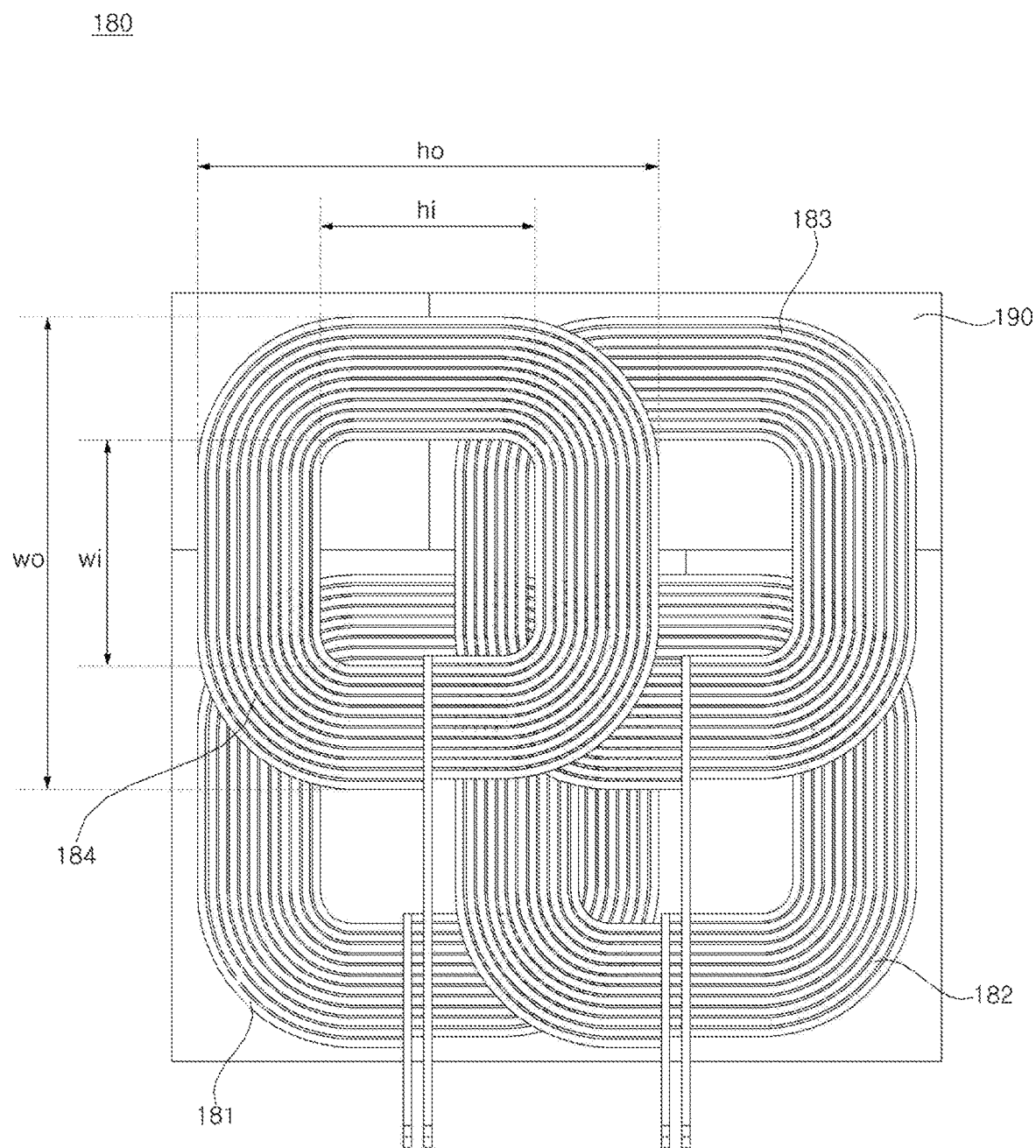
FIG. 4 is a diagram for explaining a structure of a coil unit of FIG. 2.

Specifically, since the plurality of coils 181 to 184 of the present invention are partially overlapped to form a layer as shown in FIG. 4, the intensities of object detection signal and coil selection signal on the charging surface on which the power reception apparatus 200 is disposed may be different, when each coil transmits an object detection signal and a coil selection signal with the same transmission intensity.

Such a difference in intensity between the object detection signal and the coil selection signal on the charging surface may cause an error in the object detection and the operation coil combination.

In order to solve this problem, the transmission intensity of the object detection signal and the transmission intensity of the coil selection signal may be set by compensating the distance between each coil and the charging surface on which the wireless power reception apparatus 200 is disposed.

For example, as the distance between the charging surface and the coil increases, the transmission intensity of the object detection signal and the transmission intensity of the coil selection signal may be set to be larger.

Accordingly, the intensity of each object detection signal on the charging surface on which the wireless power reception apparatus 200 is disposed may be the same. In addition, all the intensities of the respective coil selection signals on the charging surface may be the same. Meanwhile, the transmission intensity of the compensated object detection signal and the transmission intensity of the coil selection signal may be stored in the memory 120, as a factory calibrated value.

The memory 120 may store the total quality factor Qt and the individual quality factor Qi of the resonant circuit unit 180, in a normal state. The normal state may mean a case where only the wireless power reception apparatus 200 exists without a foreign material on the charging surface.

The memory 120 may store a first reference range in which the first measurement error is reflected in the total quality factor Qt of the resonance circuit unit 180, in the normal state.

In addition, the memory 120 may store the second reference range in which the second measurement error is reflected in the individual quality factors Qi of each of the plurality of coils 181 to 184, in the normal state.

The controller 160 may control overall operation of the wireless power transfer apparatus 100.

The controller 160 may select an operation coil combination to be used for wireless power transfer, from the coil combination generated by the coil combination generation unit 161, and charge the wireless power reception apparatus 200 through the selected operation coil combination.

In detail, the controller 160 may transmit a coil selection signal and receive a response signal for coil selection, through a coil included in the coil combination.

In addition, the controller 160 may select an operation coil combination to be used for wireless power, from coil combination based on the intensity of the response signal and the charging efficiency of the wireless power reception apparatus 200.

The controller 160 may wirelessly transmit power to the wireless power reception apparatus 200, through an operation coil combination.

Meanwhile, the coil combination generation unit 161 may transmit an object detection signal through the plurality of coils 181, and calculate an invalid coil based on the amount of current change with respect to the object detection signal.

In addition, the coil combination generation unit 161 may generate an effective coil combination excluding the invalid coil among the plurality of coils 181.

In this case, the controller 160 may select the operation coil combination to be used for wireless power, from the effective coil combination.

Meanwhile, the coil combination generation unit 161 may calculate the power of the wireless power reception apparatus 200, based on unique information of the wireless power reception apparatus 200 received through the resonance circuit unit 180, and may calculate the number of operation coils based on the calculated power of the wireless power reception apparatus 200.

In addition, the coil combination generation unit 161 may generate a coil combination according to the number of operation coils.

Meanwhile, the coil combination generation unit 161 may be a component included in the controller 160 unlike FIG. 2. That is, the coil combination generation unit 161 may be implemented as a part of the controller 160.

Meanwhile, the wireless power transfer apparatus 100 of the present invention may further include a sensing unit (not shown) for measuring the temperature of each of the plurality of coils (181 to 184), and the voltage, current, etc. of the power sent to the wireless power reception apparatus 200. At this time, the controller 160 may stop the wireless power transfer to the wireless power reception apparatus 200 based on the voltage, current, temperature information, and the like measured by the sensing unit 130.

FIG. 3 is an internal block diagram of a wireless power reception apparatus in the wireless power system of FIG. 1.

Referring to the drawing, the wireless power reception apparatus 200 may include a power reception unit 280 for receiving wireless power from the wireless power transfer apparatus 100, a rectifier 210 for rectifying the received wireless power, a switching regulator 220 for stabilizing the rectified wireless power, and a switching regulator controller 230 for controlling the switching regulator 220, and outputting the operation power to a load.

In addition, the wireless power reception apparatus 200 may further include a first communication unit 240 and a second communication unit 150 for communicating with the wireless power transfer apparatus 100.

The power reception apparatus 280 may receive the wireless power transmitted from the resonant circuit unit 180. To this end, the power reception apparatus 280 may include a reception coil 281.

In the reception coil 281, an induced electromotive force may be generated by a magnetic field generated in any one of the plurality of coils 181 to 184. The wireless power due to the induced electromotive force may be directly supplied to the load using the wireless power through the rectifier 210, and the switching regulator 220 described later, or the power may be used to charge the battery when the load is a battery.

The reception coil 281 may be formed on a printed circuit board (PCB) in a conductive pattern in the form of a thin film. The reception coil 281 may be printed on a reception pad (not shown) in a closed loop shape. The reception coil 281 may have a wound shape so as to have the polarity in the same direction.

Meanwhile, the wireless power reception apparatus 200 may further include a capacitor element (not shown) for forming a resonance circuit with the resonant circuit unit 180 in the wireless power transfer apparatus 100. At this time, the capacitor element (not shown) may be connected in series or in parallel to the reception coil 281.

The rectifier 210 may rectify the wireless power received through the reception coil 281 when receiving the wireless power from the wireless power transfer apparatus 100. The rectifier 210 may include at least one diode element (not shown).

The switching regulator 220 may output the rectified wireless power as a charging power v supplied to the battery, under the control of the switching regulator controller 230.

The switching regulator controller 230 may apply a regulator control signal Src to the switching regulator to control the charging power v to be outputted.

Meanwhile, the switching regulator 220 may adjust the output voltage by performing DC-DC conversion according to a regulator control signal Src of the switching regulator controller 230. The switching regulator 220 may control the output voltage based on the regulator control signal Src to output the charging power v having a voltage of a specified magnitude.

Meanwhile, the wireless power reception apparatus 200 may not include a separate microprocessor, and the switching regulator may be controlled by the switching regulator controller 230, when the rectified charging power v is outputted at a voltage of a certain magnitude by the switching regulator. When the wireless power reception apparatus 200 does not include a microprocessor, hardware configuration may be simplified and power consumption may be reduced.

Figure 5:
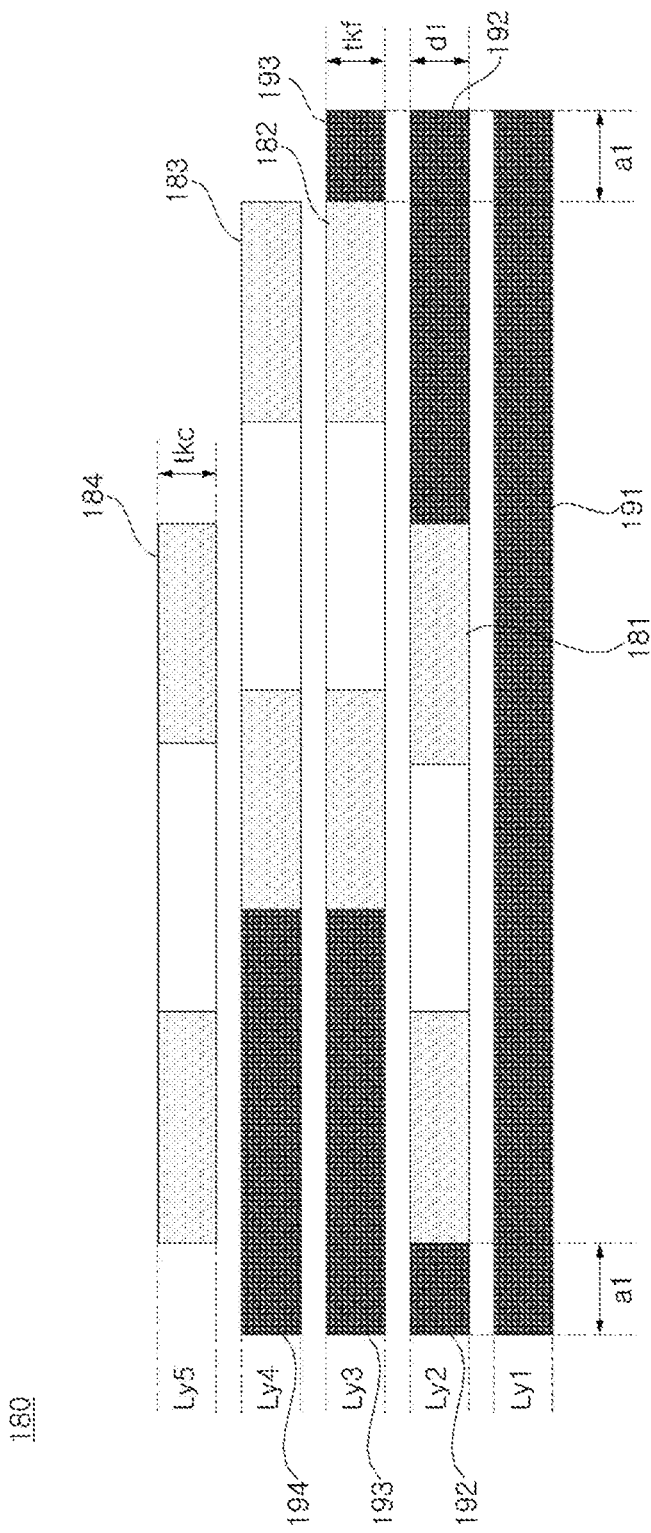
FIG. 5 is a perspective view illustrating a hierarchical structure of the coil unit of FIG. 4.

FIG. 4 is a diagram for explaining a structure of a coil unit of FIG. 2, and FIG. 5 is a perspective view illustrating a hierarchical structure of the coil unit of FIG. 4.

Referring to the drawing, the resonant circuit unit 180 according to the embodiment of the present invention may include first to fourth coils 181 to 184.

As the resonant circuit unit 180 includes the first to fourth coils 181 to 184, instead of a single large coil, it is possible to prevent the reduction in power efficiency due to the stray magnetic fields of the large coil, as well as to increase the degree of freedom of the charging surface.

Some area of the first to fourth coils 181 to 184 may be partially overlapped with each other. Specifically, as shown in FIG. 4, the first coil 181 overlaps with the second coil 182 in some area, the second coil 182 overlaps with the third coil 183 in some area, and the third coil 183 overlaps with the fourth coil 184 in some area.

The overlapped area of the first to fourth coils 181 to 184 may be set in such a manner that dead zone that is a non-chargeable area is minimized. Specifically, the overlapped area of the first to fourth coils 181 to 184 may be set in such a manner that the dead zone in the center of the charging area is minimized.

The first to fourth coils 181 to 184 may be manufactured with preset outer length ho, inner length hi, outer width wo, inner width wi, thickness, and number of turns. In addition, the outer length ho, the inner length hi, the outer width wo, and the inner width wi of the first to fourth coils 181 to 184 may be the same.

Meanwhile, since the fourth coil 184 is disposed closest to the wireless power reception apparatus 200, the inductance of the fourth coil 184 is set smaller than the inductance of the first to third coils 181 to 183. This is to make the power transfer amount or power efficiency of the surface of the resonance circuit unit 180 constant.

The first to fourth coils 181 to 184 may be disposed on the shielding member 190. The shielding member 190 may include ferrite made of one element or a combination of two or more elements selected from a group consisting of cobalt (Co), iron (Fe), nickel (Ni), boron (B), silicon (Si), and the like. The shielding member 190 may be disposed in one side of the coil to shield the leaking magnetic field and maximize the directionality of the magnetic field.

The shielding member 190 may be formed with an area larger than the area where the first to fourth coils 181 to 184 are disposed. For example, as shown in FIGS. 4 to 5, the shielding member 190 may be formed to extend at intervals al from the horizontal outer side of the first to fourth coils 181 to 184. In addition, the shielding member 190 may be formed to extend at intervals al from the longitudinal outer side of the first to fourth coils 181 to 184.

Since the shielding member 190 is formed larger than the outer length of the first to fourth coils 181 to 184, the leakage magnetic field may be reduced, and the directionality of the magnetic field may be maximized.

Meanwhile, since some area of the first to fourth coils 181 to 184 is overlapped with each other, lifting phenomenon may occur in the non-overlapped area. For example, in FIG. 5, since only some area of the first coil 181 and the second coil 182 is overlapped with each other, a distance of d1 may be occurred in the non-overlapped area.

Due to such a separation distance, the leakage magnetic field of the second coil 182 may not be shielded, so that the transmission efficiency of the wireless power transfer apparatus 100 may be reduced, and the direction of the magnetic field may be dispersed. In addition, due to such a separation distance, the wireless power transfer apparatus 100 may be easily damaged by an external shock.

In order to solve this problem, according to the present invention, the first to fourth coils 181 to 184 and the shielding member 190 may form a layer.

In more detail, a base shielding member 191 may be disposed in a first layer ly1 of the resonance circuit unit 180.

A first coil 181 and a first shielding member 192 may be disposed in a second layer ly2 that is an upper side of the basic shielding member 191.

In a third layer ly3 that is an upper side of the first coil 181, a second coil 182 partially overlapped with the first coil 181 may be disposed. At this time, the first shielding member 192 disposed in the second layer ly2 prevents the lifting phenomenon caused by an overlapping structure of the first coil 181 and the second coil 182.

In the same manner, not only the second coil 182 but also the second shielding member 193 may be disposed in the third layer ly3 of the resonance circuit unit 180.

In a fourth layer ly4 that is an upper side of the second coil 182, a third coil 183 partially overlapped with the second coil 182 may be disposed. At this time, the second shielding member 193 disposed in the third layer ly3 prevents the lifting phenomenon caused by an overlapping structure of the second coil 182 and the third coil 183.

In addition, in the fourth layer ly4 of the resonant circuit unit 180, not only the third coil 183 but also the third shielding member 194 may be disposed, and the third shielding member 194 may prevent the lifting phenomenon caused by an overlapping structure of the third coil 183 and the fourth coil 184.

In addition, since the first to fourth coils 181 to 184 should be bonded to the shielding member 190 (including the base shielding member 191 and the first to third shielding members 192 to 194) without the lifting phenomenon, the thickness ttk of the shielding member is preferably the same as the thickness tkc of the first to fourth coils 181 to 184.

Meanwhile, FIG. 5 shows that each layer of the resonant circuit unit 180 is spaced apart from each other, but this is for convenience of description, and each layer of the resonant circuit unit 180 may be in close contact with each other.

As the resonant circuit portion 180 is disposed as shown in FIG. 5, the floating phenomenon of the first to fourth coils 181 to 184 which are partially overlapped is prevented, and separation of the first to fourth coils 181 to 184 can be prevented from an external impact.

In addition, since the shielding member 190 is disposed in one side of each coil, the leakage magnetic field is shielded, and the direction of the magnetic field is more concentrated, thereby increasing the transmission efficiency.

In addition, as the shielding member 190 is disposed between the respective coils, heat generated in the multi-coils may be more easily reduced.

Meanwhile, the first to fourth coils 181 to 184 may be accommodated in a case not shown for convenience of description. In one side surface of the case, the wireless power reception apparatus 200 may be placed. When the wireless power reception apparatus 200 is placed in one side surface of the case, since the resonant circuit unit 180 wirelessly transmits power to charge the wireless power reception apparatus 200, one side surface of the case where the wireless power reception apparatus 200 is placed may be referred to as a charging surface. In addition, the charging surface and the interface surface may be used interchangeably.

Figure 6:
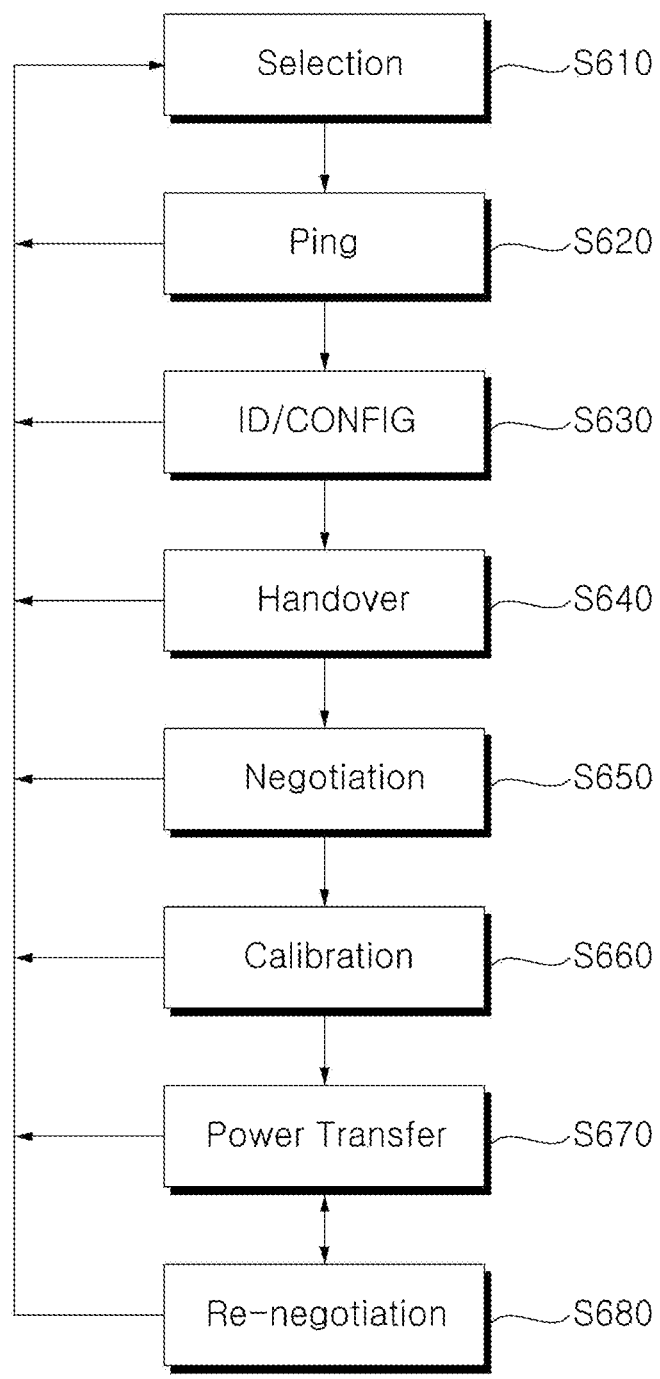
FIG. 6 is a flowchart illustrating a wireless power transfer method according to an embodiment of the present invention.

FIG. 6 is a flowchart illustrating a wireless power transfer method according to an embodiment of the present invention.

Referring to FIG. 6, a wireless power transfer method includes a selection phase S610, a ping phase S620, an identification and configuration phase S630, a handover phase S640, a negotiation phase S650, a calibration phase S660, a power transfer phase S670, and a re-negotiation phase S680.

First, in the selection phase S610, the wireless power transfer apparatus 100 may detect whether objects exist in a detection area.

The wireless power transfer apparatus 100 may detect whether object exists in the detection area, based on a power change (e.g., a current change of a coil) for the object detection signal, so as to detect whether objects exist in the detection area. In this case, the object detection signal may be an analog ping (AP) signal of very short pulse. The wireless power transfer apparatus 100 may transmit an analog ping (AP) signal on a certain cycle until an object is detected on the charging surface.

When the wireless power transfer apparatus 100 includes a plurality of coils 181, the wireless power transfer apparatus 100 transmits an object detection signal through a plurality of coils 181 in a certain order, and may detect whether an object exists in the charging area based on the current change amount of the coil with respect to each detection signal.

In detail, when the current change amount is greater than or equal to a preset current change amount, the wireless power transfer apparatus 100 may calculate that an object exists in a charging area corresponding to the coil. In this case, the coil may be referred to as an effective coil used for an effective coil combination described later.

In the selection phase S610, the wireless power transfer apparatus 100 may calculate whether a foreign material exists in the charging area. The foreign material may be a metallic object including a coin, a key, or the like, and the foreign material may be referred to as a foreign object (FO).

In the selection phase S610, the wireless power transfer apparatus 100 may continuously detect the disposition or removal of an object in the detection area. In addition, in the selection phase S610, when the wireless power transfer apparatus 100 detects an object in the detection area, it may transit to the ping phase S620.

When the wireless power transfer apparatus 100 detects an object, the wireless power transfer apparatus 100 may transmit a receiver detection signal for awaking the wireless power reception apparatus 200 and identifying whether the detected object is the wireless power reception apparatus 200, in the ping phase S620. In this case, the receiver detection signal may be a digital ping (DP) signal.

The digital ping (DP) signal may be set to have a larger duty in comparison with an analog ping (AP) signal so as to attempt communication setting with the wireless power reception apparatus 200.

The wireless power reception apparatus 200 may modulate a digital ping (DP) signal, and transmit the modulated digital ping (DP) signal to the wireless power transfer apparatus 100.

The wireless power transfer apparatus 100 may demodulate a modulated digital ping (DP) signal, and acquire detection data of digital form corresponding to a response to a receiver detection signal from the demodulated digital ping (DP) signal.

The wireless power transfer apparatus 100 may recognize the wireless power reception apparatus 200 that is a target of power transfer from the detection data of digital form.

When the wireless power transfer apparatus 100 identifies the wireless power reception apparatus 200 in the ping phase S620, it may transit to the identification and configuration phase S630.

Alternatively, when the wireless power transfer apparatus 100 does not receive the detection data of digital form in the ping phase S620, it may transit to the selection phase S610 again.

In the identification and configuration phase S630, the wireless power transfer apparatus 100 may control to receive identification information, power information, and the like transmitted by the wireless power reception apparatus 200, and transfer power efficiently.

First, in the identification and configuration phase S630, the wireless power reception apparatus 200 may transmit identification data.

The identification data may include version information of wireless power transfer protocol, manufacturer information of the wireless power reception apparatus 200, basic apparatus identifier information, and information indicating existence of extension apparatus identifier.

In addition, in the identification and configuration phase S630, the wireless power reception apparatus 200 may transmit power data.

The power data may include information on maximum power of the wireless power reception apparatus 200, information on remaining power, power class information, and the like.

The wireless power transfer apparatus 100 may identify the wireless power reception apparatus 200 based on the identification data and the power data, and acquire power information of the wireless power reception apparatus 200.

When the wireless power transfer apparatus 100 identifies the wireless power reception apparatus 200 and acquires power information of the wireless power reception apparatus 200, it may transit to the handover phase S640.

Alternatively, if the wireless power transfer apparatus 100 does not receive the identification data and/or the power data in the identification and configuration phase S630, it may transit to the selection phase S610.

The wireless power transfer apparatus 100 may calculate whether to change the method of communication with the wireless power reception apparatus 200, in the handover phase S640.

In detail, the wireless power transfer apparatus 100 may calculate whether to maintain the in-band communication or to change the communication method into the out-of-band communication method, based on the power information of the wireless power reception apparatus 200 acquired in at least one of the phases among the selection phase S610, the ping phase S620, and the identification and configuration phase S630, in the state of communicating with the wireless power reception apparatus 200 in an in-band communication method. Meanwhile, the wireless power transfer apparatus 100 may calculate whether it is necessary to enter the negotiation phase S650, based on a negotiation field value received in the identification and configuration phase S630 or the handover phase S640.

The wireless power transfer apparatus 100 may perform a foreign object detection (FOD) procedure by transiting to the negotiation phase S650, when a negotiation is necessary, as a result of the calculation.

In addition, the wireless power transfer apparatus 100 may transit to the power transfer phase S670 immediately, when negotiation is unnecessary, as a result of the calculation.

In the selection phase S610 or the negotiation phase S650, the wireless power transfer apparatus 100 may determine whether to enter the calibration phase S660, based on the calculated presence of foreign matter on the charging surface.

When no foreign matter is detected, the wireless power transfer apparatus 100 may transit to the power transfer phase S670 through the calibration phase S660.

Alternatively, when the foreign matter is detected, the wireless power transfer apparatus 100 may transit to the selection phase S610 without performing power transfer.

In operation S660, the wireless power transfer apparatus 100 may calculate a power loss, based on a difference between the transmission power of the wireless power transfer apparatus 100 and the reception power of the wireless power reception apparatus 200.

In the power transfer phase S670, the wireless power transfer apparatus 100 may transmit power to the wireless power reception apparatus 200.

In the power transfer phase S670, the wireless power transfer apparatus 100 may receive power control information from the wireless power reception apparatus 200 during power transfer, and may adjust the characteristic of the power applied to the coil, in response to the received power control information.

In the power transfer phase S670, the wireless power transfer apparatus 100 may transit to the selection phase S610, when receiving unexpected data, when not receiving expected data, e.g., power control information for a certain (time out), when a violation for a preset power transfer contract occurs, or when charging is completed.

In addition, in the power transfer phase S670, when the wireless power transfer apparatus 100 needs to reconfigure the power transfer negotiation according to the state change, or the like of the wireless power transfer apparatus 100 or the wireless power reception apparatus 200, it may transit to the renegotiation phase S680. In this case, when the renegotiation is normally completed, the wireless power transfer apparatus 100 may return to the power transfer phase S670.

Figure 7:
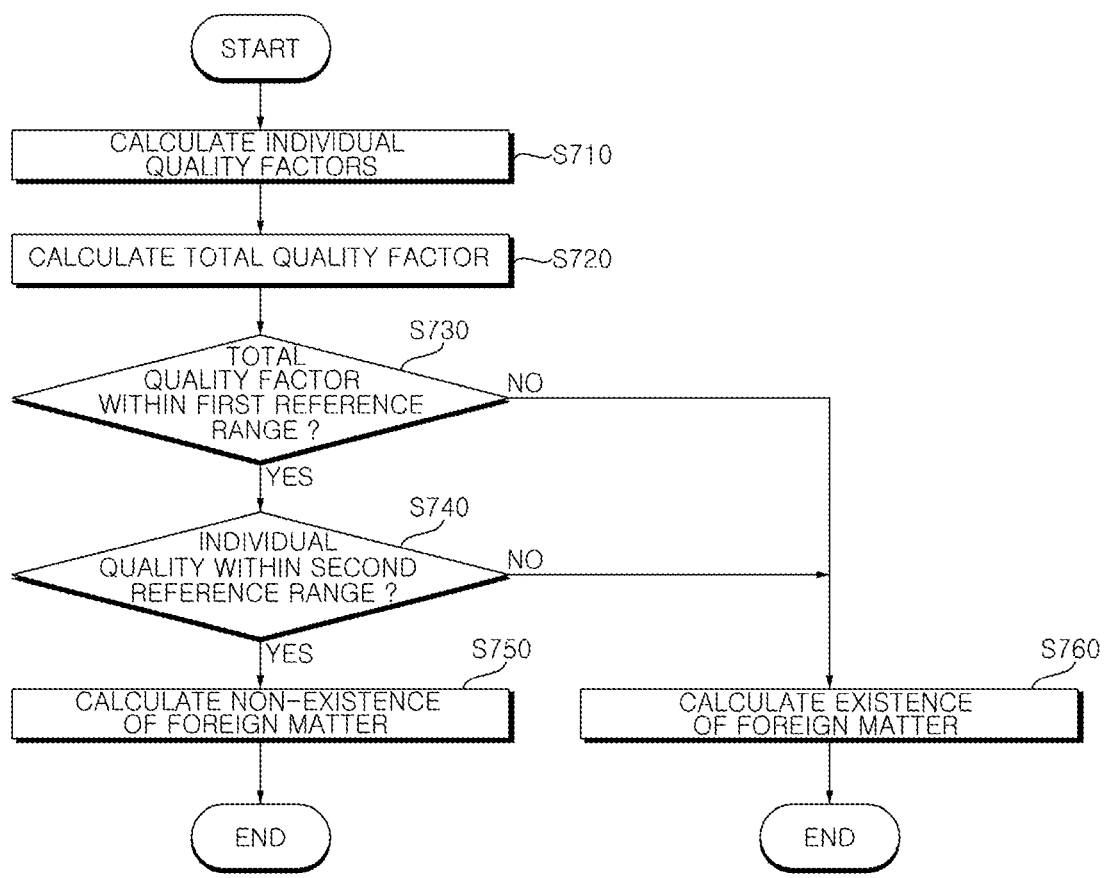
FIG. 7 is a flowchart illustrating a foreign matter detection method according to an embodiment of the present invention.
Figure 8:
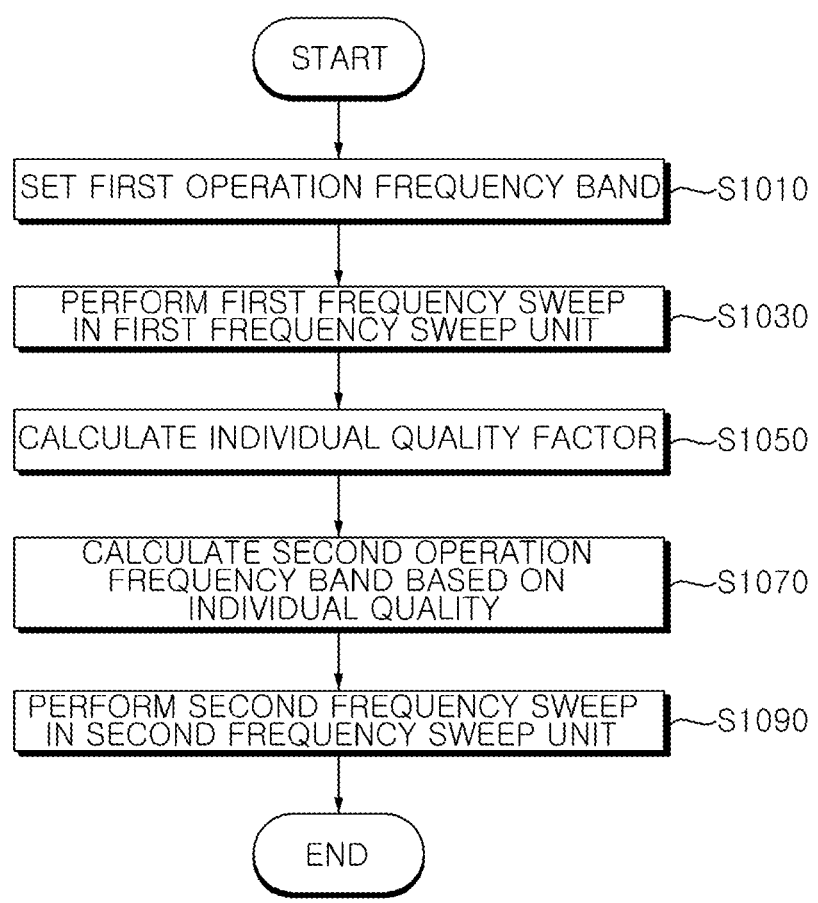
FIG. 8 is a flowchart for explaining a frequency sweep method for calculating an individual quality factor at a resonant frequency according to an embodiment of the present invention.
Figure 9:
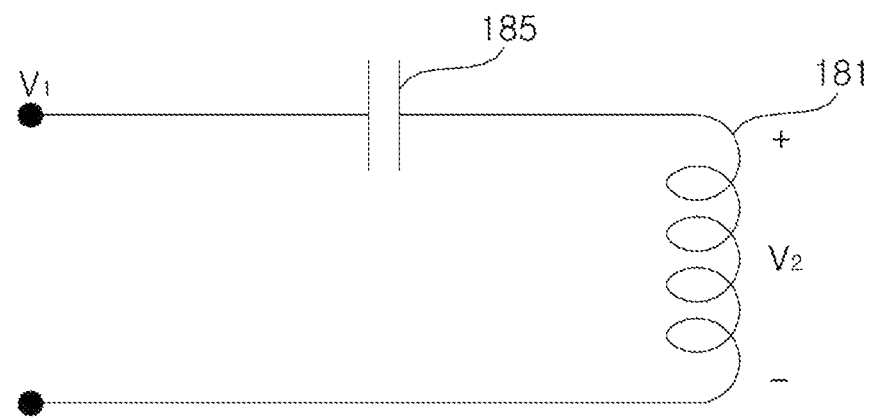
FIG. 9 is a flowchart for explaining a method of calculating the individual quality factor of FIG. 8.
Figure 11:
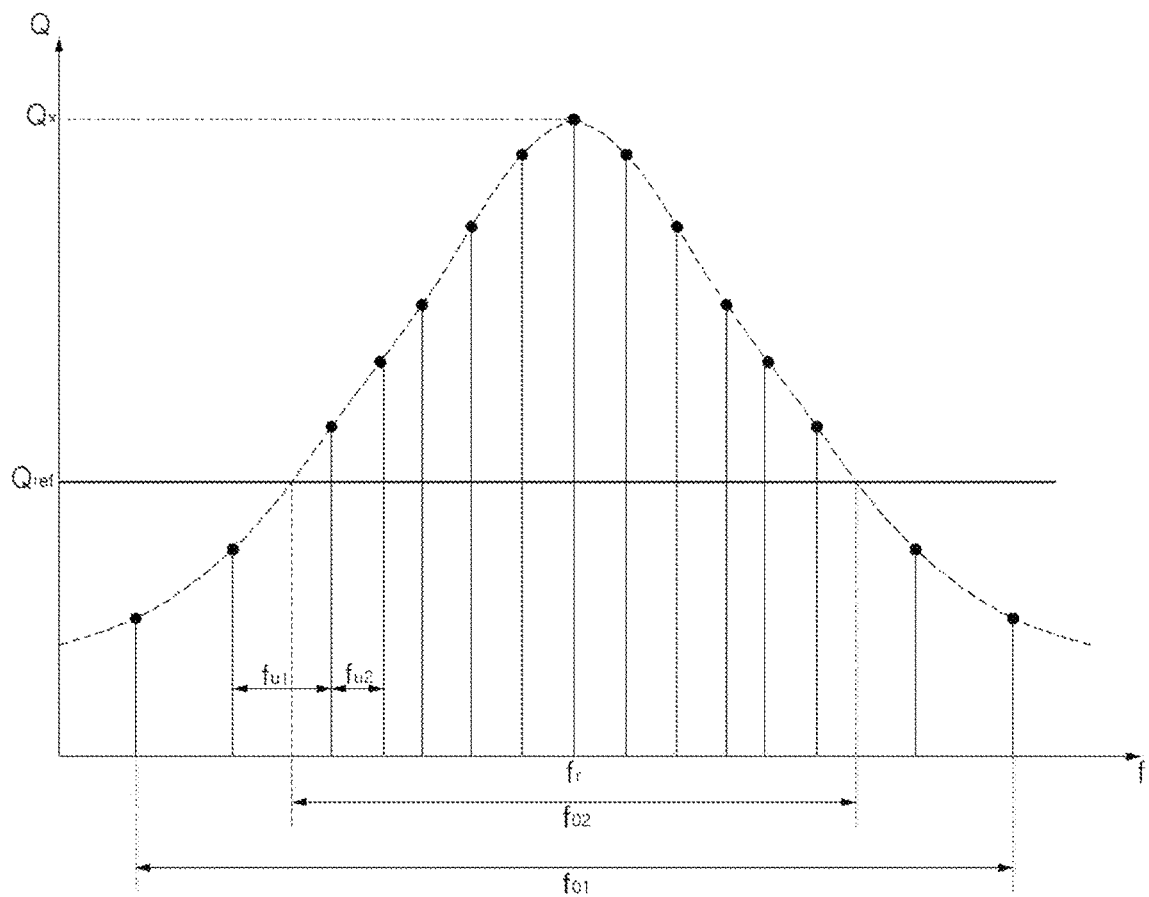
FIG. 11 is a flowchart for explaining the frequency sweep method of FIG. 8.

FIG. 7 is a flowchart illustrating a foreign matter detection method according to an embodiment of the present invention, FIG. 8 is a flowchart for explaining a frequency sweep method for calculating an individual quality factor at a resonant frequency according to an embodiment of the present invention, FIG. 9 is a flowchart for explaining a method of calculating the individual quality factor of FIG. 8, FIG. 10 is a reference diagram for explaining the individual quality factor of FIG. 8, and FIG. 11 is a flowchart for explaining the frequency sweep method of FIG. 8.

Referring to the drawings, in FIG. 7, the controller 160 may calculate individual quality factors of the plurality of coils 181 to 184 at the resonance frequency (S710).

Specifically, in FIG. 9, the input voltage V1 may be applied to the resonance circuit unit 180. Accordingly, the voltage V2 may be applied to both ends of a first coil 181. Similarly, a voltage of −V2 which has the same amplitude as V2 but has the opposite phase may be applied to a first capacitor element 185.

In FIG. 9, V2 is shown as the voltage of both ends of the first coil 181, but the result is the same even when V2 is the voltage of both ends of the first capacitor element 185.

The first voltage detection unit 131 may detect an input voltage V1 inputted to each of the plurality of coils 181 to 184.

The second voltage detection unit 133 may detect voltage V2 of both ends of each of the plurality of coils 181 to 184.

For example, the input voltage V1 and the voltage V2 detected by the first voltage detection unit 131 and the second voltage detection unit 133 may be the same as in FIG. 10.

The first voltage detection unit 131 may transmit the input voltage V1 inputted to each of the plurality of coils 181 to 184 to the controller 160, as a detection value.

The second voltage detection unit 133 may transmit the voltage V2 inputted to each of the plurality of coils 181 to 184 to the controller 160, as a detection value.

The controller 160 may calculate the individual quality factors Qi of each of the plurality of coils 181 to 184 by using Equation 1, based on the input voltage V1 and the voltage V2.

In particular, the controller 160 may calculate the individual quality factor Qi of each of the plurality of coils 181 to 184, at the resonance frequency.

The controller 160 may perform frequency sweep so as to calculate the individual quality factor Qi of each of the plurality of coils 181 to 184, at the resonance frequency.

More specifically, in FIGS. 8 and 11, the controller 160 may sweep from a low frequency to a high frequency, within an operation frequency band.

The controller 160 may set a first operation frequency band (fo1) (S1010). In this case, the operation frequency means an available frequency of the wireless power transfer apparatus 100, and may be a preset value. For example, the first operation frequency band (fo1) may be 70 kHz to 120 kHz.

The controller 160 may perform a first frequency sweep in a first frequency sweep unit (fu1), within the first operation frequency band (fo1) (S1030).

For example, the controller 160 may perform a first frequency sweep in 300 Hz step from a low frequency to a high frequency within the first operation frequency band (fo1) of 70 kHz to 120 kHz.

Meanwhile, the first frequency sweep may be performed simultaneously or sequentially with respect to the plurality of coils 181 to 184.

The first voltage detection unit 131 and the second voltage detection unit 133 may transmit the detected voltage value to the controller 160 in response to the first frequency sweep.

The controller 160 may calculate the individual quality factor Qi of each of the plurality of coils 181 to 184, corresponding to the frequency sweep, based on each input voltage V1 and each voltage V2 (S1050).

The controller 160 may calculate a second operation frequency band (fo2), based on the individual quality factor Qi of the plurality of coils 181 to 184 calculated according to the first frequency sweep (S1070).

The controller 160 may calculate an operation frequency band in which the individual quality factor Qi of each of the plurality of coils 181 to 184 calculated according to the first frequency sweep is larger than a preset reference quality factor Qref, as a second operation frequency band (fo2).

The second operation frequency band (fo2) may mean a band smaller than the first operation frequency band (fo1), as shown in FIG. 11.

The controller 160 may perform a second frequency sweep, in a second frequency sweep unit (fu2) smaller than the first frequency sweep unit (fu1), within the second operation frequency band (fo2) (S1090).

For example, in the first operation frequency band (fo1) of 70 kHz to 120 kHz, when the second frequency band (fo2) is calculated to be 100 kHz to 103 kHz, the controller 160 may perform a second frequency sweep, in 50 Hz, in a 100 kHz to 103 kHz band.

Meanwhile, the second frequency sweep may be performed simultaneously or sequentially with respect to the plurality of coils 181 to 184.

In addition, in some embodiments, the second operation frequency band (fo2) and the second frequency sweep unit (fu2) may be different for each of the plurality of coils 181 to 184.

The first voltage detection unit 131 and the second voltage detection unit 133 may transmit the detected voltage value to the controller 160, in response to the second frequency sweep.

The controller 160 may calculate the maximum value, among the ratio of the voltage V2 to the input voltage V1 changed according to the second frequency sweep, as the individual quality factor Qi of the coil, at the resonance frequency.

Meanwhile, although the input voltage V1 inputted to each of the plurality of coils 181 to 184 usually does not change despite the frequency sweep, in practice, as shown in FIG. 10, it may be slightly reduced, at the point of time when foreign matter is placed on the charging surface.

Since the present invention calculates the individual quality factor Qi in consideration of not only the voltage V2 of the plurality of coils 181 to 184 but also the input voltage V1 inputted to the plurality of coils 181 to 184, the foreign matter on the charging surface can be detected more accurately.

In addition, the present invention does not perform frequency sweep in a small frequency sweep unit from an initial frequency sweep step, but may be divided into two steps. At a first step, the frequency sweep may be performed in a large frequency sweep unit to roughly search the quality factor at the resonant frequency. At a second step, the frequency sweep may be performed in a small frequency sweep unit to determine the quality factor at the resonance frequency.

Thus, the quality factor search at the resonant frequency can be performed more efficiently, and more accurate quality factor search can be achieved.

In addition, since the present invention does not directly search resonant frequency, but detects foreign matter, based on the change of quality factor according to frequency sweep, the calculation process is simpler than the case where the resonant frequency value is directly derived, and foreign matter can be detected more quickly.

Meanwhile, the controller 160 may calculate the total quality factor Qt at the resonance frequency, based on the individual quality factor Qi at the resonance frequency (S720).

The controller 160 may calculate the sum of the individual quality factors Qi at the resonance frequency, as the total quality factor Qt at the resonance frequency, according to Equation 2.

Meanwhile, the controller 160 may calculate whether the total quality factor is within a first reference range (S730).

In this case, the first reference range may be a value acquired by adding a first measurement error to the normal threshold value of the total quality factor Qt. Meanwhile, the normal threshold value may mean the total quality factor Qt of the plurality of coils 181 to 184 when there is no foreign matter on the charging surface. In addition, the first measurement error may be, for example, ±1.2%.

The first reference range is a preset value, and may be stored in the memory 120. The first reference range may be preset in consideration of the structure of the wireless power transfer apparatus 100, a coil capacity, and a design. Alternatively, the first reference range may be a value determined by measurement.

If the total quality factor Qt at the resonant frequency is not included in the preset first reference range, the controller 160 may calculate that foreign matter exists on the charging surface (S760).

In addition, when the total quality factor Qt at the resonance frequency is not included in the preset first reference range, the controller 160 may calculate that the wireless power reception apparatus 200 is not disposed on the charging surface.

When the total quality factor Qt at the resonant frequency is not included in the preset first reference range, the wireless power transfer apparatus 100 according to the present invention calculates that a foreign material exists on the charging surface, or the wireless power reception apparatus 200 is not disposed. Therefore, as shown in FIG. 6, there is an advantage that the transmitter does not need to send an analog ping (AP) for detecting an object on the charging surface.

Meanwhile, if only the total quality factor Qt at the resonance frequency detects a foreign matter on the charging surface, an error may occur. That is, the total quality factor Qt at the resonance frequency is in the normal range, but at least one of the individual quality factors may be deviated from the normal range.

Therefore, even if the total quality factor Qt at the resonant frequency is included in the first reference range, the controller 160 does not immediately calculate that there is no foreign matter on the charging surface, and recalculate the existence of foreign matter on the charging surface, based on the individual quality factor Qi at the resonant frequency.

The controller 160 may calculate whether the individual quality factor Qi at the resonance frequency is included in the second reference range, in the state where the total quality factor Qt at the resonance frequency is included in the first reference range (S740).

The controller 160 may calculate that foreign matter exists on the surface, when the individual quality factor Qi at the resonance frequency is not included in the second reference range, while the total quality factor Qt at the resonance frequency is included in the first reference range. (S760).

The controller 160 may calculate that foreign matter does not exist on the surface, when the individual quality factor Qi at the resonance frequency is included in the second reference range, while the total quality factor Qt at the resonance frequency is included in the first reference range (S750).

According to the above process, the wireless power transfer apparatus 100 according to the embodiment of the present invention can detect the foreign matter on the charging surface more efficiently, by only the quality factor calculation, without the inductance calculation or the resonant frequency calculation of the resonant circuit unit 180.

Meanwhile, the controller 160 of the present invention may be embodied as a processor readable code on a processor readable recording medium included in the power transfer apparatus 100. The processor-readable recording medium includes all kinds of recording devices that store data that can be read by the processor. Examples of the processor-readable recording medium include ROM, RAM, CD-ROM, magnetic tape, floppy disk, optical data storage device, and the like, and may also be implemented in the form of a carrier wave such as transmission over the Internet. The processor-readable recording medium can also be distributed over network coupled computer systems so that the processor-readable code is stored and executed in a distributed fashion.

Since the wireless power transfer apparatus according to the embodiment of the present invention can detect foreign matter based on the total quality factor of the multi-coil and the individual quality factor, without needing to calculate the inductance, or the like of the multi-coil, the foreign matter on the charging surface can be detected more easily.

In addition, when the total quality factor of the multi-coil is deviated from the normal range, the wireless power transfer apparatus calculates that there is foreign matter on the charging surface or that the wireless power reception apparatus is not disposed. When even the individual quality factor is included in the normal range while the total quality factor of the multi-coil is included in the normal range, it is calculated that the wireless power reception apparatus is disposed on the charging surface. Therefore, it is not necessary to transmit analog ping (AP) for object detection, as in the related art.

Meanwhile, if only the total quality factor of the multi-coil is used to detect the foreign matter on the charging surface, an error may occur in foreign matter detection. However, since the present invention detects the foreign matter on the surface, in consideration of not only the total quality factor of the multi-coil, but also the individual quality factor, the accuracy of foreign matter detection is improved.

In addition, since the wireless power transfer apparatus calculates the individual quality factor, considering not only the voltage of the coil or capacitor (corresponding to V2 of the present invention) but also the input voltage (corresponding to V1 of the present invention) inputted to the coil or capacitor, the accuracy of the quality factor calculation is increased, and accordingly, the accuracy of the foreign material detection is also increased.

Meanwhile, when there is foreign matter on the charging surface, the quality factor Q is usually reduced, but, due to the design error, measurement error, movement of foreign matter, or the like, the quality factor may be increased. Therefore, the method of detecting the foreign matter on the charging surface based on the threshold value of the conventional quality factor has the disadvantage that the foreign material detection is inaccurate. However, the present invention calculates the existence of the foreign matter on the charging surface, according to whether the quality factor is included in a normal range (corresponding to the first reference range, the second reference range of the present invention), so that foreign material can be more accurately detected.

In addition, in order to calculate the quality factor at the resonance frequency, the wireless power transfer apparatus initially performs the first frequency sweep in units of first frequency sweep within the first operation frequency band, and performs the second frequency sweep, based on an individual quality factor value of each of the plurality of coils calculated according to the first frequency sweep, in units of the second frequency sweep smaller than the unit of the first frequency sweep, within a second operation frequency band smaller than the first operation frequency band. Therefore, the frequency sweep time for calculating the quality factor is shortened, so that it is possible to perform more accurate quality factor calculation through the second frequency sweep as well as to reduce the total charging time.

In addition, since the wireless power transfer apparatus includes multi-coil partially overlapped, the foreign matter on the charging surface can be detected by using the total quality factor of the multi-coil and the individual quality factor while expanding the charging area, thereby increasing the accuracy of the foreign matter detection.

In addition, the wireless power transfer apparatus can detect the foreign matter through the power transfer coil without a separate circuit or module for detecting the foreign matter, thereby simplifying a circuit structure and reducing the manufacturing cost.

In addition, the wireless power transfer apparatus may detect foreign matter on the charging surface through a combination of feature values, and stop charging when detecting the foreign matter, thereby protecting the user from dangers such as explosion, fire, and the like.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

What is claimed is:

1. An apparatus for transferring wireless power, the apparatus comprising:
    a resonant circuit including:
        a plurality of coils, and
        a plurality of capacitor elements that are respectively connected to the plurality of coils;
    a first voltage detector configured to detect an input voltage input to each of the plurality of coils;
    a second voltage detector configured to detect a voltage of both ends of each of the plurality of coils; and
    a controller configured to:
        calculate individual quality factors of the plurality of coils at a resonance frequency,
        calculate a total quality factor of the plurality of coils at the resonance frequency, and
        determine whether foreign matter exists on a charging surface based on the total quality factor and the individual quality factors.

2. The apparatus of claim 1, wherein the controller is configured to determine that foreign matter exists on the charging surface based on a determination that the total quality factor at the resonance frequency is absent from a first reference range.

3. The apparatus of claim 2, wherein the controller is configured to, based on a determination that the total quality factor at the resonance frequency is included in the first reference range, determine whether foreign matter exists on the charging surface based on the individual quality factors at the resonance frequency.

4. The apparatus of claim 3, wherein the controller is configured to determine that foreign matter does not exist on the charging surface based on a determination that all of the individual quality factors at the resonance frequency are included in a second reference range, in a state where the total quality factor at the resonance frequency is included in the first reference range.

5. The apparatus of claim 1, wherein the controller is configured to:
    calculate, according to a frequency sweep that results in changing voltage levels, a maximum value of a ratio of the voltage of both ends of each of the plurality of coils to the input voltage input to each of the plurality of coils,
    use the maximum value as an individual quality factor of a corresponding coil at the resonance frequency, and
    calculate a sum of the individual quality factors at the resonance frequency as the total quality factor at the resonance frequency.

6. The apparatus of claim 5, wherein the controller is configured to sweep from a low frequency to a high frequency, within an operation frequency band,
    wherein the first voltage detector is configured to transmit, to the controller, the input voltage inputted to each of the plurality of coils in response to the frequency sweep,
    wherein the second voltage detector is configured to transmit, to the controller, a voltage of both ends of each of the plurality of coils in response to the frequency sweep.

7. The apparatus of claim 6, wherein the controller is configured to, after performing a first frequency sweep within a first operation frequency band:
    calculate a second operation frequency band smaller than the first operation frequency band based on the individual quality factors calculated according to the first frequency sweep, and
    perform a second frequency sweep within the second operation frequency band.

8. The apparatus of claim 7, wherein the controller is configured to calculate, as the second operation frequency band, a band in which each of the individual quality factors calculated according to the first frequency sweep is greater than a preset reference quality factor.

9. The apparatus of claim 3, further comprising a memory configured to store the first reference range and the second reference range,
    wherein the first reference range is a value acquired by adding a first measurement error to the total quality factor of the plurality of coils calculated, at the resonance frequency, when foreign matter does not exist on the charging surface, and
    wherein the second reference range is a value acquired by adding a second measurement error to each of the individual quality factors calculated, at the resonance frequency, when foreign matter does not exist on the charging surface.

10. The apparatus of claim 1, wherein the resonant circuit comprises first to fourth coils disposed to be partially overlapped with each other.

11. A method of transferring wireless power, the method comprising:
    calculating individual quality factors of a plurality of coils at a resonance frequency;
    calculating a total quality factor of the plurality of coils at the resonance frequency; and
    determining whether foreign matter exists on a charging surface based on the total quality factor and the individual quality factors,
    wherein calculating individual quality factors of the plurality of coils comprises:
        detecting an input voltage input to each of the plurality of coils; and
        detecting a voltage of both ends of each of the plurality of coils.

12. The method of claim 11, wherein determining whether foreign matter exists on a charging surface comprises:
    determining that foreign matter exists on the charging surface based on a determination that the total quality factor at the resonance frequency is absent from a first reference range, and
    based on a determination that the total quality factor at the resonance frequency is included in the first reference range:

determining whether foreign matter exists on the charging surface based on the individual quality factors at the resonance frequency, and determining that foreign matter does not exist on the charging surface based on a determination that all of the individual quality factors at the resonance frequency are included in a second reference range, in a state where the total quality factor at the resonance frequency is included in the first reference range.

13. The method of claim 11, wherein calculating individual quality factors of the plurality of coils comprises:

calculating, according to a frequency sweep that results in changing voltage levels, a maximum value of a ratio of the voltage of both ends of each of the plurality of coils to the input voltage input to each of the plurality of coils, and using the maximum value as an individual quality factor of a corresponding coil at the resonance frequency.

14. The method of claim 13, wherein calculating the total quality factor of the plurality of coils comprises calculating a sum of the individual quality factors at the resonance frequency as the total quality factor at the resonance frequency.

15. The method of claim 13, wherein the frequency sweep is performed from a low frequency to a high frequency.

16. The method of claim 13, wherein, after performing a first frequency sweep within a first operation frequency band:

calculating a second operation frequency band smaller than the first operation frequency band based on the individual quality factors calculated according to the first frequency sweep, and performing a second frequency sweep within the second operation frequency band.

17. The method of claim 16, wherein calculating the second operation frequency band comprises calculating the second operation frequency band as a band in which each of the individual quality factors calculated according to the first frequency sweep is greater than a preset reference quality factor.

18. The method of claim 12, wherein the first reference range is a value acquired by adding a first measurement error to the total quality factor of the plurality of coils calculated, at the resonance frequency, when foreign matter does not exist on the charging surface, and the second reference range is a value acquired by adding a second measurement error to each of the individual quality factors calculated, at the resonance frequency, when foreign matter does not exist on the charging surface.

19. The method of claim 11, wherein the plurality of coils are disposed to be partially overlapped with each other.

* * * * *